United States Patent
Abotabl et al.

(10) Patent No.: US 12,207,188 B2
(45) Date of Patent: Jan. 21, 2025

(54) TECHNIQUES FOR DEFERRAL OF WAKE-UP SIGNALING FOR NETWORK NODE SLEEP MODES

(71) Applicant: QUALCOMM Incorporated, San Diego, CA (US)

(72) Inventors: Ahmed Attia Abotabl, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/820,788

(22) Filed: Aug. 18, 2022

(65) Prior Publication Data

US 2024/0064630 A1    Feb. 22, 2024

(51) Int. Cl.
*H04W 52/02* (2009.01)
(52) U.S. Cl.
CPC .............................. *H04W 52/0206* (2013.01)
(58) Field of Classification Search
CPC .................................................. H04W 52/0206
See application file for complete search history.

(56) References Cited

U.S. PATENT DOCUMENTS

| | | | | |
|---|---|---|---|---|
| 2017/0048918 | A1* | 2/2017 | Iwamura | H04W 76/27 |
| 2024/0137849 | A1* | 4/2024 | Li | H04W 48/12 |
| 2024/0205829 | A1* | 6/2024 | Ma | H04W 76/27 |

FOREIGN PATENT DOCUMENTS

EP    2941063 A1    11/2015

OTHER PUBLICATIONS

Interdigital, et al., "Performance evaluation for network energy saving", 3GPP TSG RAN WG1 #110, R1-2206665, 3rd Generation Partnership Project, Mobile Competence Centre, 650, Route Des Lucioles, F-06921 Sophia-Antipolis Cedex, France, vol. RAN WG1, No. Toulouse, Aug. 22, 2022-Aug. 26, 2022, Aug. 12, 2022, 8 Pages, XP052274593, 3 Evaluation Methodology 4 Evaluation Results (Uplink).
International Search Report and Written Opinion—PCT/US2023/070449—ISA/EPO—Nov. 10, 2023.
Samsung: "Network energy saving techniques", 3GPP TSG RAN WG1 #110, R1-2206839, 3rd Generation Partnership Project, Mobile Competence Centre, 650, Route Des Lucioles, F-06921 Sophia-Antipolis Cedex, France, vol. RAN WG1, No. Toulouse, Aug. 22, 2022-Aug. 26, 2022, Aug. 12, 2022, 15 Pages, XP052274776, 6.1 gNB wake up request.

* cited by examiner

*Primary Examiner* — Barry W Taylor
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a first indication that a network node is in a sleep mode. The UE may receive a second indication of periodic wake-up signal (WUS) occasions associated with the sleep mode. The UE may receive a third indication to defer, for one or more WUS occasions, a transmission of a WUS associated with data, deferral of the transmission being based at least in part on a latency parameter associated with the data. Numerous other aspects are described.

30 Claims, 10 Drawing Sheets

TECHNIQUES FOR DEFERRAL OF WAKE-UP SIGNALING FOR NETWORK NODE SLEEP MODES

FIELD OF THE DISCLOSURE

Aspects of the present disclosure generally relate to wireless communication and to techniques and apparatuses for deferral of wake-up signaling for network node sleep modes.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving a first indication that a network node is in a sleep mode. The method may include receiving a second indication of periodic wake-up signal (WUS) occasions associated with the sleep mode. The method may include receiving a third indication to defer, for one or more WUS occasions, a transmission of a WUS associated with data, deferral of the transmission being based at least in part on a latency parameter associated with the data.

Some aspects described herein relate to a method of wireless communication performed by a network node. The method may include transmitting a first indication that the network node is in a sleep mode. The method may include transmitting a second indication of periodic WUS occasions associated with the sleep mode. The method may include transmitting a third indication to defer, for one or more WUS occasions, a transmission of a WUS associated with data, deferral of the transmission being based at least in part on a latency parameter associated with the data.

Some aspects described herein relate to a UE for wireless communication. The UE may include a memory and one or more processors coupled to the memory. The one or more processors may be configured to receive a first indication that a network node is in a sleep mode. The one or more processors may be configured to receive a second indication of periodic WUS occasions associated with the sleep mode. The one or more processors may be configured to receive a third indication to defer, for one or more WUS occasions, a transmission of a WUS associated with data, deferral of the transmission being based at least in part on a latency parameter associated with the data.

Some aspects described herein relate to a network node for wireless communication. The network node may include a memory and one or more processors coupled to the memory. The one or more processors may be configured to transmit a first indication that the network node is in a sleep mode. The one or more processors may be configured to transmit a second indication of periodic WUS occasions associated with the sleep mode. The one or more processors may be configured to transmit a third indication to defer, for one or more WUS occasions, a transmission of a WUS associated with data, deferral of the transmission being based at least in part on a latency parameter associated with the data.

Some aspects described herein relate to a non-transitory computer-readable medium that stores a set of instructions for wireless communication by a UE. The set of instructions, when executed by one or more processors of the UE, may cause the UE to receive a first indication that a network node is in a sleep mode. The set of instructions, when executed by one or more processors of the UE, may cause the UE to receive a second indication of periodic WUS occasions associated with the sleep mode. The set of instructions, when executed by one or more processors of the UE, may cause the UE to receive a third indication to defer, for one or more WUS occasions, a transmission of a WUS associated with data, deferral of the transmission being based at least in part on a latency parameter associated with the data.

Some aspects described herein relate to a non-transitory computer-readable medium that stores a set of instructions for wireless communication by a network node. The set of instructions, when executed by one or more processors of the network node, may cause the network node to transmit a first indication that the network node is in a sleep mode. The set of instructions, when executed by one or more processors of the network node, may cause the network node to transmit a second indication of periodic WUS occasions associated with the sleep mode. The set of instructions, when executed by one or more processors of the network node, may cause the network node to transmit a third indication to defer, for one or more WUS occasions, a transmission of a WUS associated with data, deferral of the transmission being based at least in part on a latency parameter associated with the data.

Some aspects described herein relate to an apparatus for wireless communication. The apparatus may include means for receiving a first indication that a network node is in a sleep mode. The apparatus may include means for receiving a second indication of periodic WUS occasions associated with the sleep mode. The apparatus may include means for receiving a third indication to defer, for one or more WUS occasions, a transmission of a WUS associated with data, deferral of the transmission being based at least in part on a latency parameter associated with the data.

Some aspects described herein relate to an apparatus for wireless communication. The apparatus may include means for transmitting a first indication that the apparatus is in a sleep mode. The apparatus may include means for transmitting a second indication of periodic WUS occasions associated with the sleep mode. The apparatus may include means for transmitting a third indication to defer, for one or more WUS occasions, a transmission of a WUS associated with data, deferral of the transmission being based at least in part on a latency parameter associated with the data.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
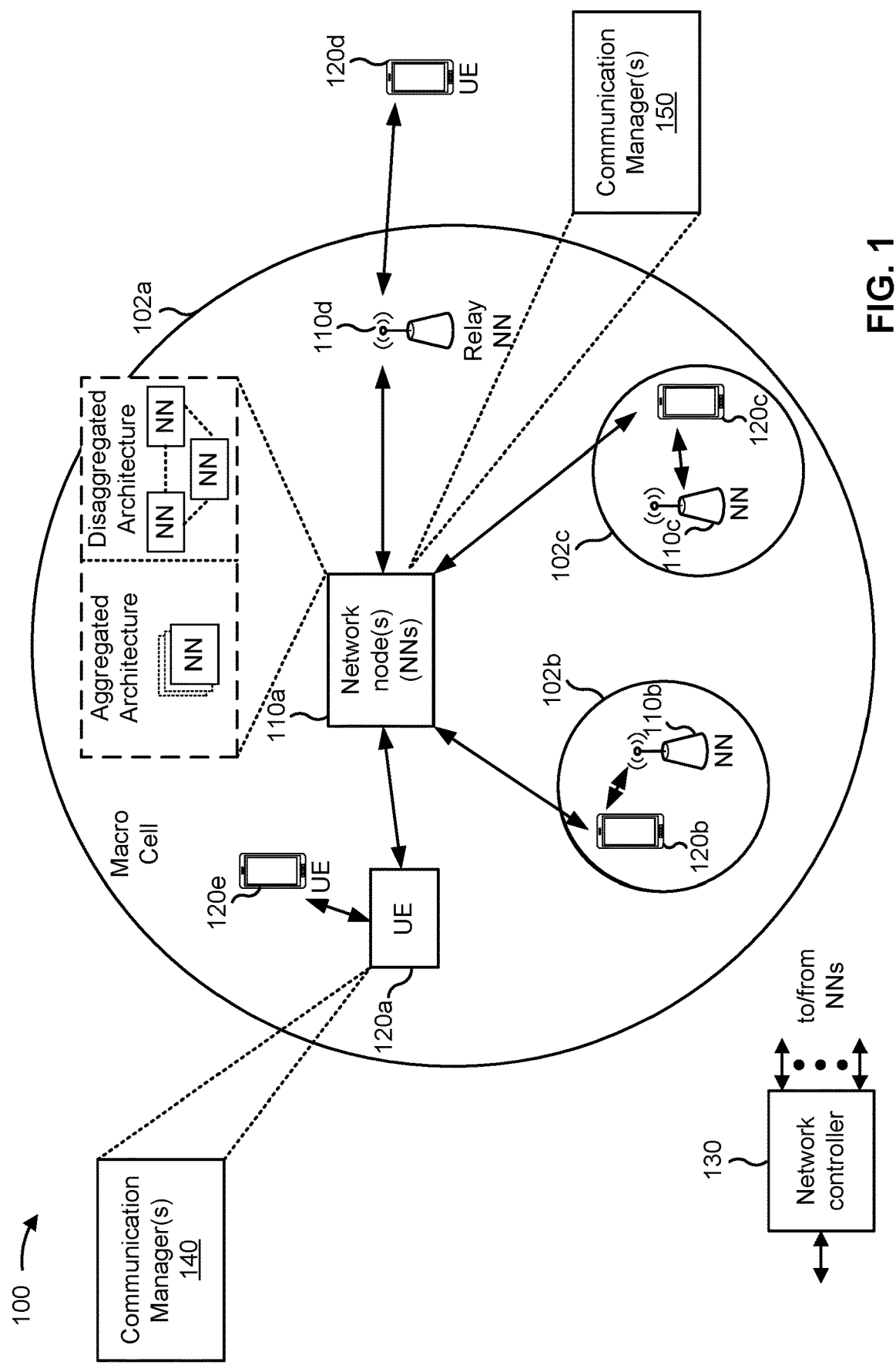
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a first indication that a network node is in a sleep mode; receive a second indication of periodic WUS occasions associated with the sleep mode; and receive a third indication to defer, for one or more WUS occasions, a transmission of a WUS associated with data, deferral of the transmission being based at least in part on a latency parameter associated with the data. Additionally, or alternatively, the communication manager 140 may perform one or more other operations described herein.

In some aspects, the network node 110 may include a communication manager 150. As described in more detail elsewhere herein, the communication manager 150 may transmit a first indication that the network node is in a sleep mode; transmit a second indication of periodic WUS occasions associated with the sleep mode; and transmit a third indication to defer, for one or more WUS occasions, a transmission of a WUS associated with data, deferral of the transmission being based at least in part on a latency parameter associated with the data. Additionally, or alternatively, the communication manager 150 may perform one or more other operations described herein.

As indicated above, FIG. 1 is provided as an example. Other examples may differ from what is described with regard to FIG. 1.

Figure 2:
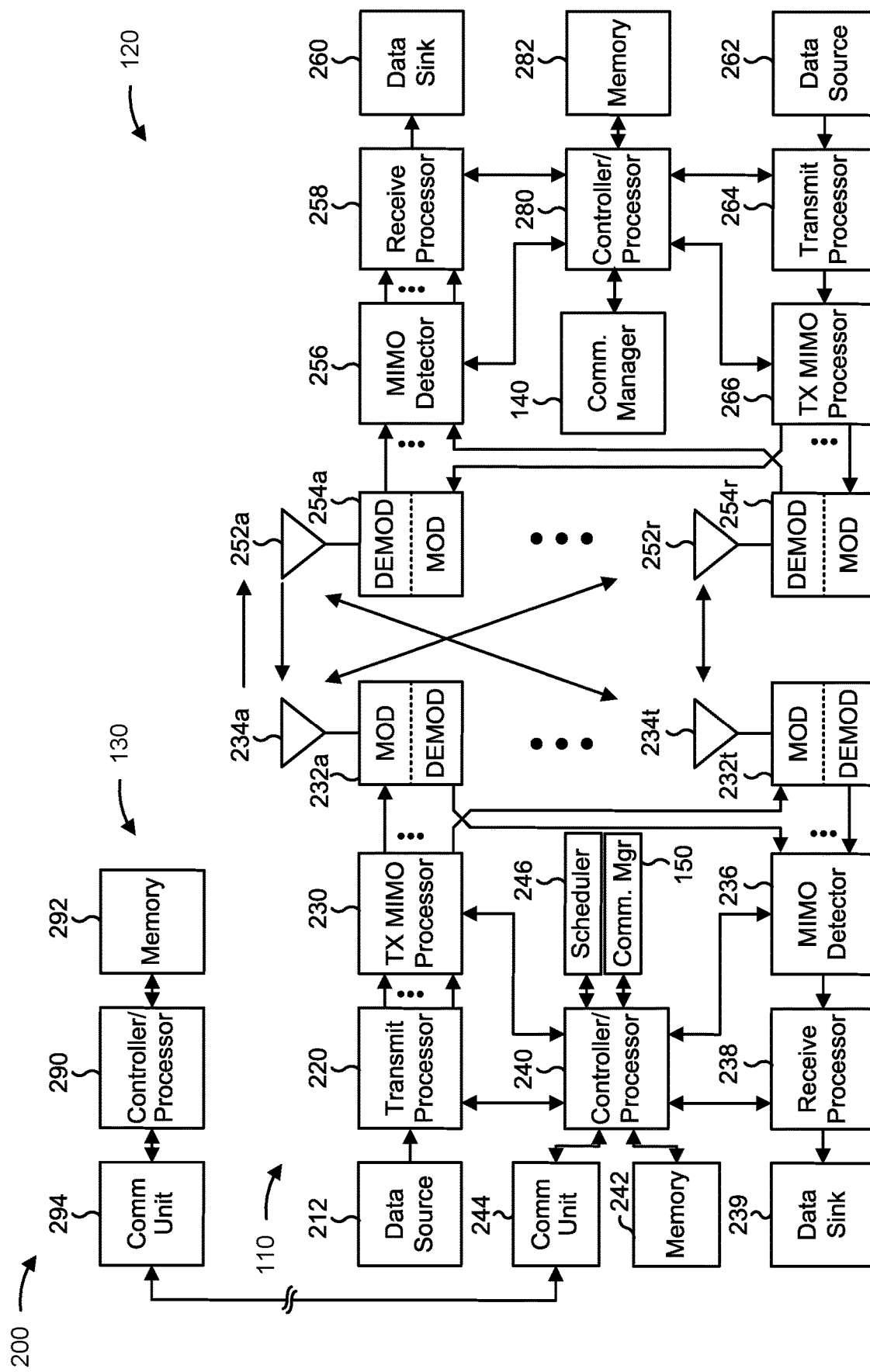
FIG. 2 is a diagram illustrating an example of a network node in communication with a UE in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-10).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with deferral of wake-up signaling for network node sleep modes, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a first indication that a network node is in a sleep mode; means for receiving a second indication of periodic WUS occasions associated with the sleep mode; and/or means for receiving a third indication to defer, for one or more WUS occasions, a transmission of a WUS associated with data, deferral of the transmission being based at least in part on a latency parameter associated with the data. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a first indication that the network node is in a sleep mode; means for transmitting a second indication of periodic WUS occasions associated with the sleep mode; and/or means for transmitting a third indication to defer, for one or more WUS occasions, a transmission of a WUS associated with data, deferral of the transmission being based at least in part on a latency parameter associated with the data. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
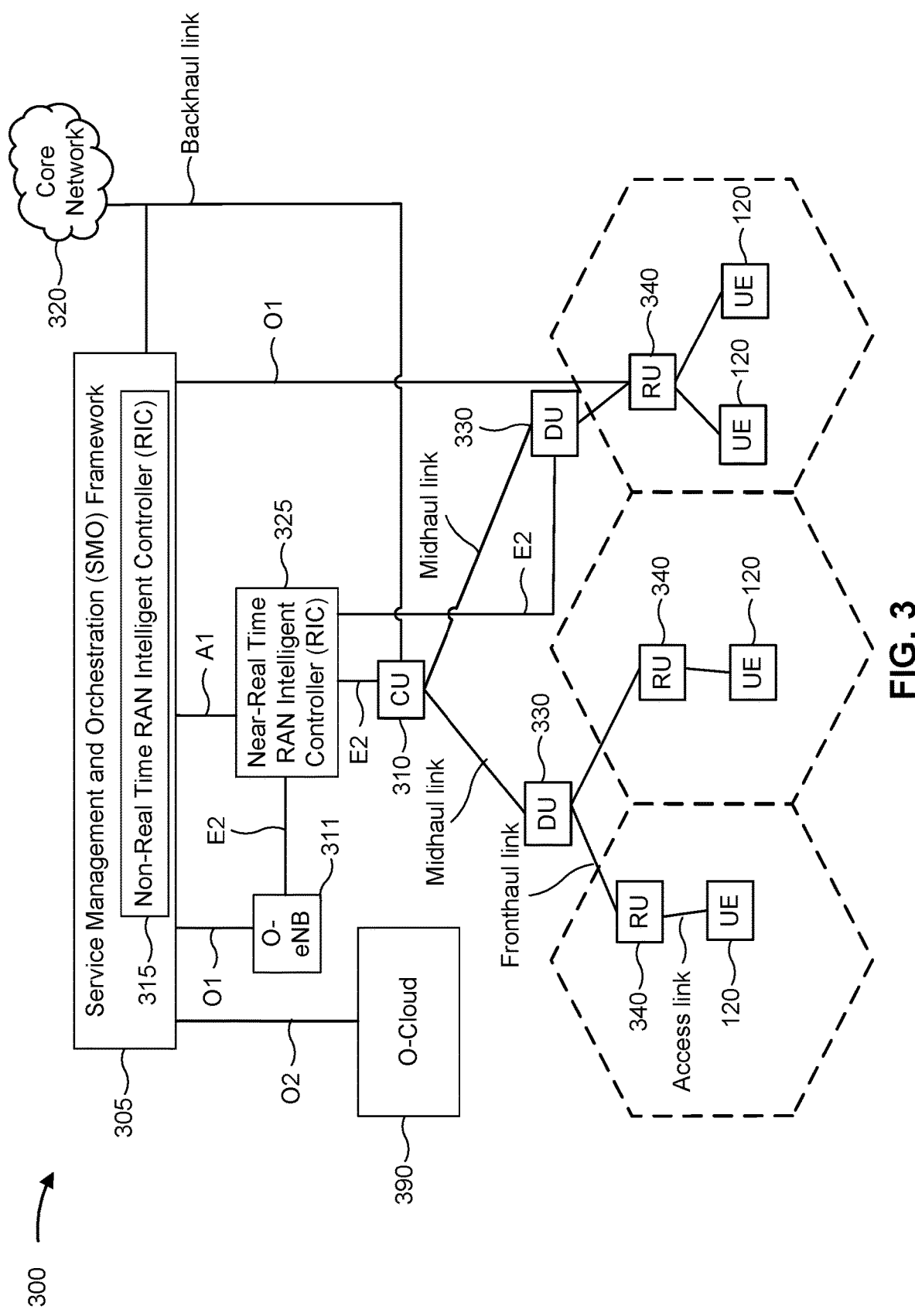
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
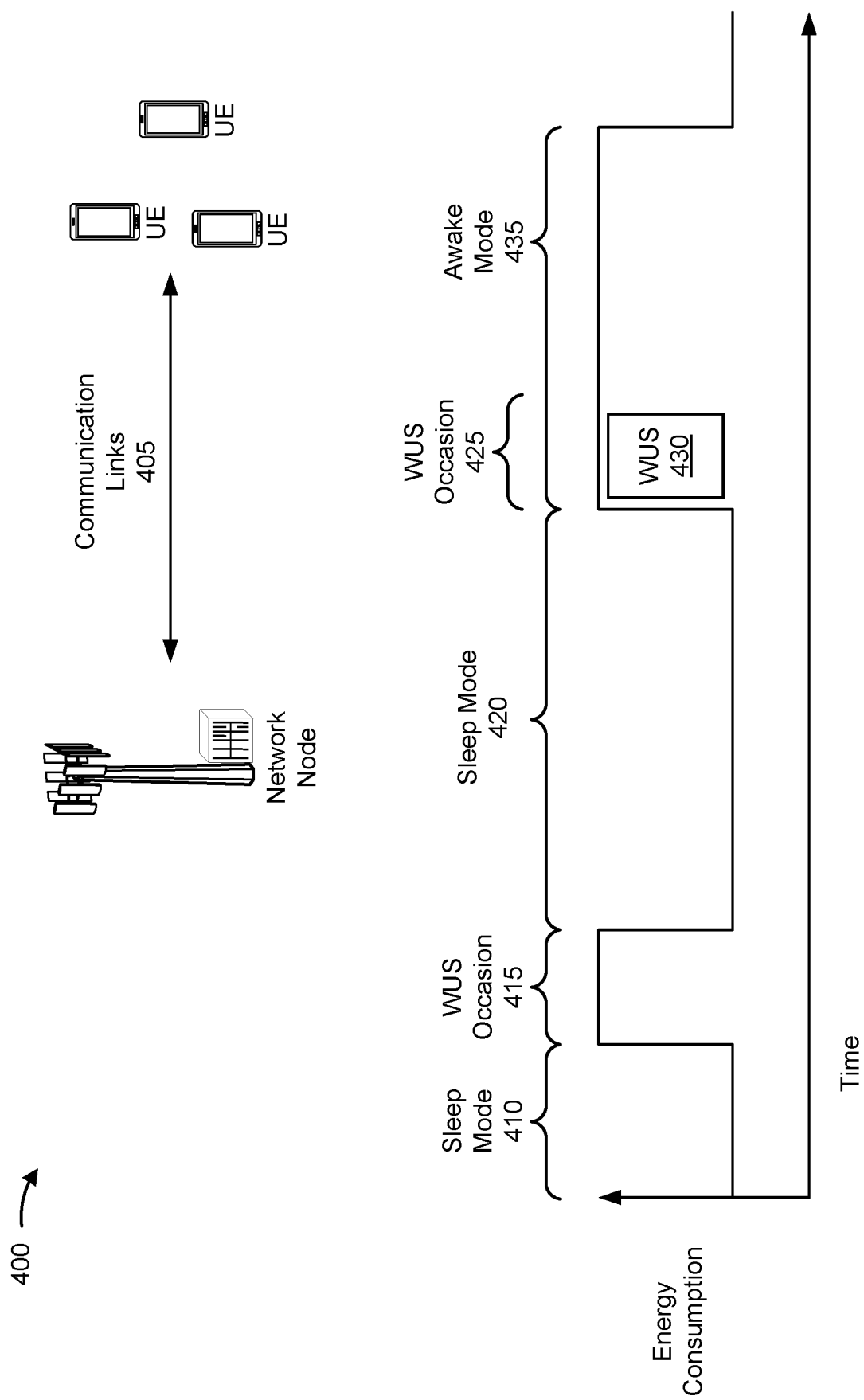
FIG. 4 is a diagram illustrating an example of a network energy saving mode, in accordance with the present disclosure.

FIG. 4 is a diagram illustrating an example 400 of a network energy saving mode, in accordance with the present disclosure. As shown in FIG. 4, a network node may communicate with multiple UEs via a wireless network. In some examples, the network node may support a cell of a wireless network to which the UEs are connected for wireless communication. As shown in FIG. 4, the network node may establish communication links 405 with the multiple UEs.

The network node may enter an energy saving mode (e.g., a power saving mode, a needs-based communication mode, and/or a discontinuous reception mode, among other examples). The energy saving mode may be selected from a set of available energy saving modes that are configured to conserve power at the network node while supporting network operation. Different energy saving modes may be associated with different power consumption and/or different transition times (e.g., an amount of time to switch between a sleep mode and an awake mode). In some networks, the network node may enter a sleep mode based at least in part on traffic conditions. For example, the network node may enter the sleep mode based at least in part on an amount of traffic and/or a periodicity of traffic satisfying a threshold.

As shown in FIG. 4, the network node may conserve energy by entering a sleep mode 410 when not receiving traffic. However, to maintain awareness of whether one or more linked UEs need to enter a connected state or perform a small data transfer (SDT), the network node may configure WUS occasions. During the WUS occasions, the network node awakens to monitor for WUSs from the one or more linked UEs.

As shown in FIG. 4, the network node does not receive a WUS during a WUS occasion 415. Based at least in part on not receiving a WUS during the WUS occasion 415, the network node returns to sleep mode 420 until a subsequent WUS occasion 425. During the WUS occasion 425, the network node receives a WUS 430 and remains in an awake mode 435 until completing communications with a UE associated with the WUS 430.

In the example 400, if any of the multiple UEs have data buffered for transmission to the network node, at least one of the multiple UEs will transmit a WUS during a WUS occasion. Depending on a number of UEs in the cell supported by the network node and/or based at least in part on a periodicity of data buffered for transmission at the multiple UEs, the network node may inefficiently awake from sleep modes more often than desired to conserve power at the network node. In some networks, awakening at each WUS occasion may consume more energy than remaining in an awake mode based at least in part on power consumed to activate RF chains to enter the awake mode.

As indicated above, FIG. 4 is provided as an example. Other examples may differ from what is described with regard to FIG. 4.

In some aspects described herein, a network node may configure linked UEs to defer transmission of WUSs based at least in part on one or more conditions. For example, the network node may configure a UE to defer transmission of WUSs based at least in part on latency requirements and/or priority requirements of data buffered for transmission (e.g., associated with transmission of a WUS). Additionally, or alternatively, the latency requirements and/or priority requirements may be associated with the UE. Based at least in part on a time until a subsequent WUS occasion satisfying the latency requirements and/or priority requirements, the UE defers transmission of the WUS until the subsequent WUS occasion. In some aspects, the UE may defer transmission of the WUS for one or multiple WUS occasions based at least in part on the one or more conditions.

In some aspects, the UE may be configured with deferral conditions based at least in part on a buffer status, a signal priority, and/or latency requirements, among other examples. In some aspects, one or more additional UEs may be configured with different deferral conditions based at least in part on a buffer status, a signal priority, and/or latency requirements, among other examples, associated with data of the one or more additional UEs.

In some aspects, the UE may transmit a deferral notice to the network node (e.g., in place of the WUS). In some aspects, the deferral notice may be in a same form as a WUS, and may have one or more characteristics that indicate a deferral notice instead of a request to wake up the network node. For example, the UE may transmit the deferral notice using a WUS occasion and/or may indicate deferral of the WUS based at least in part on a preamble used in the deferral notice.

Based at least in part on receiving the deferral notice, the network node may determine whether to wake up. For example, the network node may determine to wake up based at least in part on a number of received deferral notices satisfying a threshold, an amount of time elapsed since a previous wake up time, or a time of day, among other examples. In some aspects, the network node may use the deferral notice, along with deferral notices from other UEs, to prioritize resources for UE allocations when the network node wakes up (whether in response to the deferral notice or at a later time).

In some aspects, the network node may transmit an indication that the network node is awake. For example, the network node may broadcast or multi-cast the indication that the network node is awake. Based at least in part on receiving the indication that the network node is awake, and having data buffered for transmission and for which a WUS was deferred, the UE may transmit a scheduling request (SR).

As described herein, a WUS may include signaling that is configured for requesting the network node to wake up and support communication with an associated UE. In some aspects, the WUS may include an SR or a message configured as a WUS separate from an SR.

Based at least in part on configuring the UE to defer transmission of the WUS based at least in part on satisfaction of conditions, the network node may avoid waking up unnecessarily, may wake up for communications with more UEs for efficient use of a wake-up time, and/or may conserve energy resources of the network node.

Figure 5:
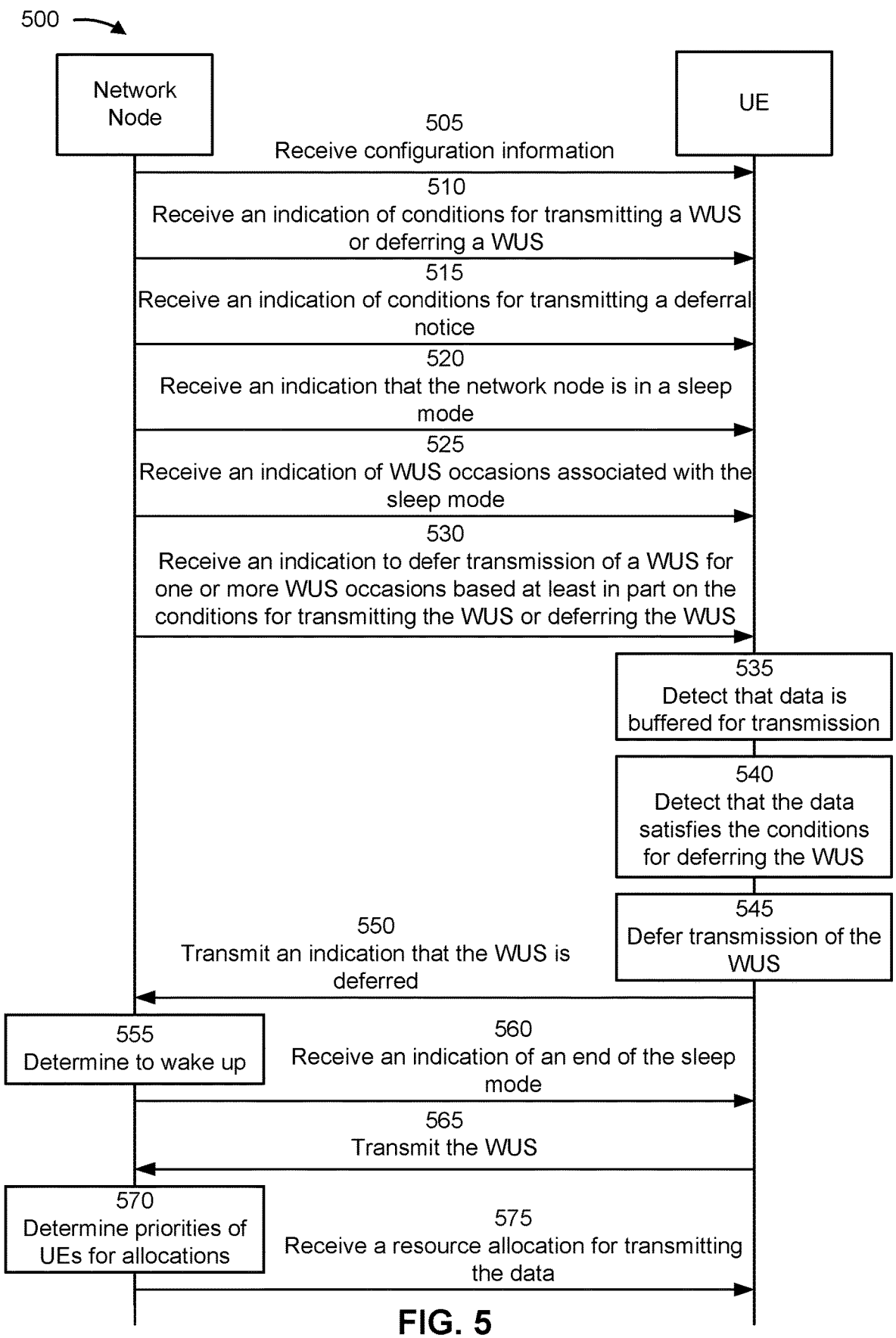
FIG. 5 is a diagram of an example associated with wake-up signaling for network node sleep modes, in accordance with the present disclosure.

FIG. 5 is a diagram of an example 500 associated with wake-up signaling for network node sleep modes, in accordance with the present disclosure. As shown in FIG. 5, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5.

As shown by reference number 505, the network node may transmit, and the UE may receive, configuration information. In some aspects, the UE may receive the configuration information via one or more of RRC signaling, one or more MAC control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to defer transmission of WUSs based at least in part on conditions. The configuration information may indicate conditions for deferral, a length of deferral, and/or types of data associated with the WUSs that are to be deferred, among other examples.

The UE may configure itself based at least in part on the configuration information. In some aspects, the UE may be configured to perform one or more operations described herein based at least in part on the configuration information.

As shown by reference number 510, the UE may receive, and the network node may transmit, an indication of conditions for transmitting a WUS or deferring a WUS.

As shown by reference number 515, the UE may receive, and the network node may transmit, an indication of conditions for transmitting a deferral notice. For example, the UE may be indicated to transmit a deferral notice a first time that the UE defers transmission of a WUS. Additionally, or alternatively, the UE may be indicated to transmit a deferral notice at each WUS during which the UE defers transmission of the WUS and/or during which the UE has data that is buffered for transmission to the network node.

As shown by reference number 520, the UE may receive, and the network node may transmit, an indication that the network node is in a sleep mode. In some aspects, the network node may transmit the indication that the network node is in a sleep mode via an RRC message (e.g., to connected UEs at a time of entering the sleep mode), via a system information block (SIB), and/or via a master information block (MIB), among other examples.

As shown by reference number 525, the UE may receive, and the network node may transmit, an indication of WUS occasions associated with the sleep mode. For example, the WUS occasions may be configured with resources on which the UE may transmit a WUS and/or an SR. The resources may be periodic. In some aspects, a macro period may indicate a WUS occasion of a series of WUS occasions that is a non-deferral WUS occasion during which UEs are not to defer transmission of WUSs.

As shown by reference number 530, the UE may receive, and the network node may transmit, an indication to defer transmission of a WUS for one or more WUS occasions based at least in part on the conditions for transmitting the WUS or deferring the WUS. In some aspects, the network node may indicate to defer the transmission of the WUS for the one or more WUS occasions based at least in part on a latency parameter associated with data associated with the WUS. The indication to defer the transmission of the WUS may apply to transmissions (e.g., all transmissions) of WUSs during the sleep mode, for which latency parameters and/or priorities satisfy a threshold.

The network node may indicate a selection of a configuration for deferral of transmissions of WUSs from a set of candidate configurations indicated in connection with reference numbers 505 and/or 510. In some aspects, the selection may be associated with a set of conditions and/or thresholds (e.g., latency thresholds or priority thresholds) associated with a determination to defer or transmit a WUS.

In some aspects, one or more of the indications described in connection with reference numbers 510-530 may be associated with a single communication. For example, the UE may receive the indications described in connection with reference numbers 520-530 as a single message (e.g., an indication of the sleep mode). In some aspects, the one or more indications may include RRC signaling and/or MAC-layer signaling (e.g., one or more MAC CEs).

As shown by reference number 535, the UE may detect that data is buffered for transmission. For example, an application client associated with the UE may generate data for transmission to an application server via the network node.

As shown by reference number 540, the UE may detect that the data satisfies the conditions for deferring the WUS. For example, the data may be associated with a latency requirement that allows for the UE to transmit the data after skipping one or more WUS occasions and/or the data may have a low priority that allows for later transmission. The data may satisfy the conditions for deferring the WUS based at least in part on a latency parameter (e.g., latency requirement) associated with the data.

In some aspects, the UE may determine to defer the transmission of the WUS based at least in part on failing to receive an indication that the network node is awake for the one or more WUS occasions (e.g., as described in connection with reference number 560), the one or more WUS occasions being configured for WUSs associated with data having a latency requirement that satisfies a threshold, a number of the one or more WUS occasions satisfying a threshold, and/or the one or more WUS occasions being configured for WUSs associated with data having a priority that satisfies a threshold, among other examples. In some aspects, the UE may determine to defer the transmission of the WUS based at least in part on a buffer status associated with the data and/or a signal priority of the WUS (e.g., a configured priority of the WUS and/or an associated WUS occasion), among other examples.

As shown by reference number 545, the UE may defer transmission of the WUS. For example, the UE may defer transmission of the WUS during a soonest WUS occasion (e.g., soonest after detecting that the data is buffered for transmission) and/or one or more additional WUS occasions. The UE may defer the transmission based at least in part on one or more characteristics of the data (e.g., the latency requirement and/or the priority requirement) and/or one or more characteristics of the UE (e.g., a priority of the UE and/or a capability of the UE), among other examples. In some aspects, deferring transmission of the WUS may be refraining from transmission of the WUS during a WUS occasion during which the UE is capable of transmitting the WUS (e.g., deferral is not based on a lack of capability to transmit during the WUS occasion).

In some aspects, the UE may defer the transmission of the WUS for one or more active intervals. An active interval may include a period of time during which the network node is awake to receive one or more WUSs and may include one or more WUS occasions.

As shown by reference number 550, the UE may transmit, and the network node may receive, an indication that the WUS is deferred. In some aspects, the indication that the WUS is deferred may include additional information, such as a priority of the data and/or a maximum deferral time, among other examples. For example, the indication of the deferral may include an indication that the UE has the data buffered for transmission and that the UE has determined to defer transmission for the one or more WUS occasions. In some aspects, the UE may indicate (e.g., implicitly) the additional information via a selection of a preamble used for the indication. For example, one or more preambles may be associated with different values of the additional information.

As shown by reference number 555, the network node may determine to wake up. In some aspects, the network node may determine to wake up based at least in part on receiving a number, that satisfies a threshold, of indications of deferred WUSs. In some aspects, the network node may determine to wake up based at least in part on expiration of a threshold amount of time from receiving an indication of a deferred WUS. In some aspects, the network node may determine to wake up based at least in part on a priority of a WUS occasion. For example, the network node may determine to wake up periodically (e.g., every 10 WUS occasions) if the network node receives any indications that a WUS was deferred during any of the WUS occasions in a period (e.g., within the previous 10 WUS occasions).

As shown by reference number 560, the UE may receive, and the network node may transmit, an indication of an end of the sleep mode (e.g., that the network node is awake and/or has woken up). In some aspects, the network node may transmit the indication via a multi-cast or broadcast message.

As shown by reference number 565, the UE may transmit, and the network node may receive, the WUS. In some aspects, the WUS may include an SR that indicates a request for resources for transmitting the data.

In some aspects, the UE may transmit the WUS (e.g., an SR) based at least in part on receiving the indication of the end of the sleep mode. In this case, the WUS may not indicate a request for the network node to wake up, because the network node is already awake, and may indicate a request for a resource allocation.

In some aspects, the UE may transmit the WUS (e.g., an SR) in absence of the indication of the end of the sleep mode. In some aspects, the UE may transmit the WUS based at least in part on the conditions for deferral no longer being satisfied. For example, the UE may transmit the WUS based at least in part on a latency requirement of the data allowing for delay associated with deferral for one or more previous WUS occasions, but not allowing for delay associated with deferral for a current WUS occasion (e.g., the UE has already deferred for a maximum number of WUS occasions).

In some aspects, the UE may transmit the WUS based at least in part on a priority of a WUS occasion. For example, the UE may not defer transmission of a WUS during a periodically scheduled non-deferral WUS occasion (e.g., every 10 WUS occasions). In this way, multiple UEs may use the periodically scheduled non-deferral WUS occasion to transmit associated WUSs to the network node and the network node may wake up for communicating with the multiple UEs.

As shown by reference number 570, the network node may determine priorities of UEs for allocations of resources. For example, the network node may allocate network resources based at least in part on reception times of indications, from different UEs, that WUSs are deferred. In this way, the network node may prioritize data that has been buffered for a longest amount of time. In some aspects, the network node may prioritize data based at least in part on an indication of a priority in the indications that WUSs are deferred.

As shown by reference number 575, the UE may receive, and the network node may transmit, a resource allocation for transmitting the data. In some aspects, the allocation may have a priority that is based at least in part on the WUS and/or the indication that the WUS is deferred, among other examples.

Based at least in part on the UE deferring transmission of the WUS, the network node may avoid waking up unnecessarily, may wake up for communications with more UEs for efficient use of a wake up time, and/or may conserve energy resources of the network node.

As indicated above, FIG. 5 is provided as an example. Other examples may differ from what is described with respect to FIG. 5.

Figure 6:
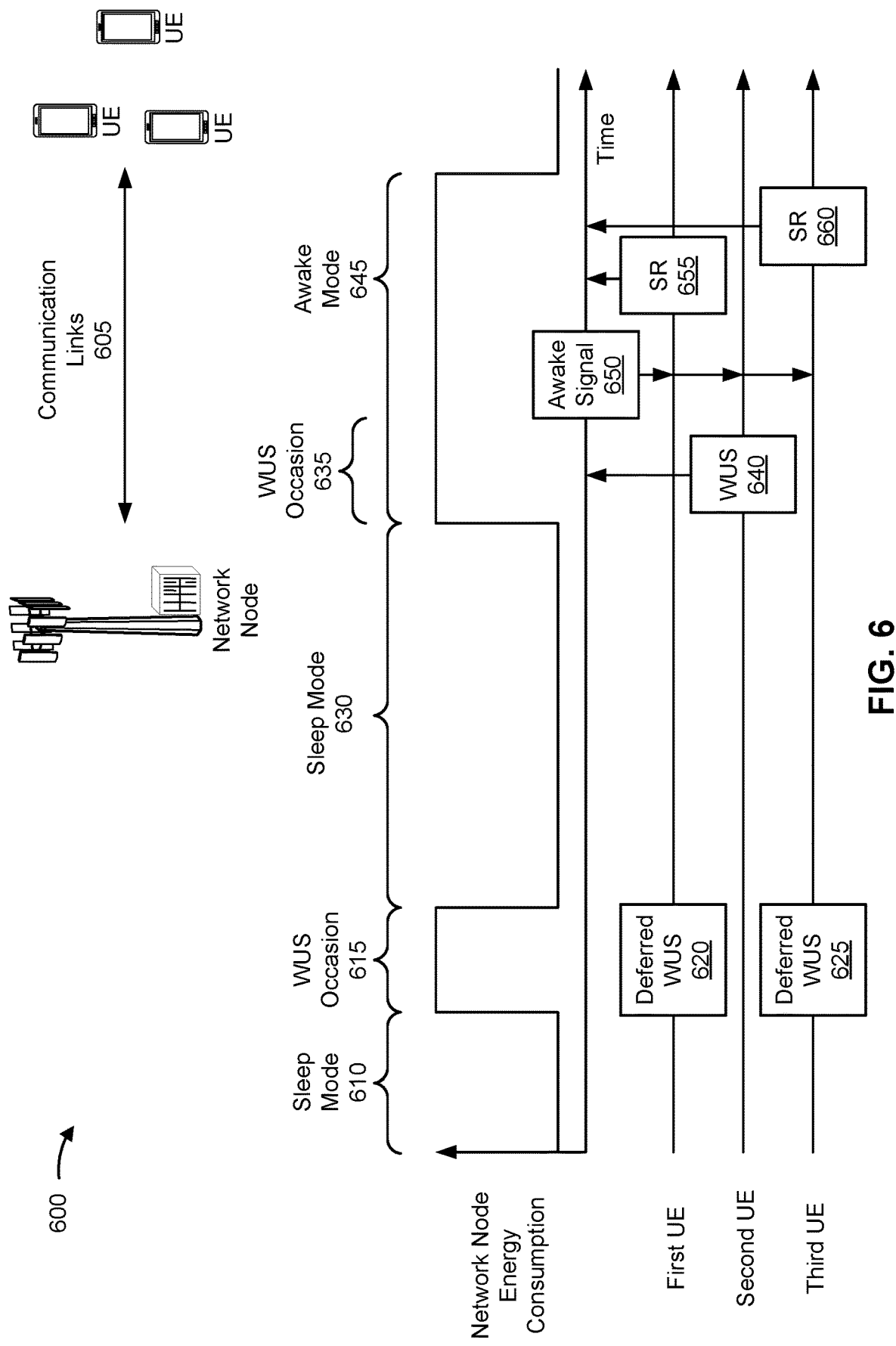
FIG. 6 is a diagram of an example associated with wake-up signaling for network node sleep modes, in accordance with the present disclosure.

FIG. 6 is a diagram of an example 600 associated with wake-up signaling for network node sleep modes, in accordance with the present disclosure. As shown in FIG. 6, a network node (e.g., network node 110, a CU, a DU, and/or an RU) may communicate with UEs (e.g., UEs 120). In some aspects, the network node and the UEs may be part of a wireless network (e.g., wireless network 100). The UEs and the network node may have established communication links 605 prior to operations shown in FIG. 6.

As shown in FIG. 6, the network node may conserve energy by entering a sleep mode 610 when not receiving traffic. However, to maintain awareness of whether one or more linked UEs need to enter a connected state or perform a SDT, the network node may configure WUS occasions. During the WUSs, the network node awakens to monitor for WUSs from the one or more linked UEs.

As shown in FIG. 6, the network node does not receive a WUS during a WUS occasion 615. The network node does not receive a WUS during the WUS occasion 615 based at least in part on a first UE refraining from transmitting a deferred WUS 620 and a third UE refraining from transmitting a deferred WUS 625 during the WUS occasion 615. The first UE and the third UE may be configured to defer transmission of WUSs based at least in part on one or more conditions, such as associated data having a latency parameter and/or a priority parameter that satisfies a threshold. For example, the first UE and the third UE may have data for transmit, and that data may have relaxed latency requirements that allow for the first UE and the third UE to wait for transmission of the data. In some aspects, the network node may awaken for an active interval that includes multiple WUS occasions (e.g., the active interval may include multiple WUS occasions within the period indicated with reference number 615 having an increased network node energy consumption).

Based at least in part on not receiving a WUS during the WUS occasion 615, the network node returns to sleep mode 630 until a subsequent WUS occasion 635. During the WUS occasion 635, the network node receives a WUS 640 from a second UE and remains in an awake mode 645 until completing communications with the second UE.

In some aspects, the network node may transmit an awake signal 650 to the first UE, the second UE, and/or the third UE to indicate that the network node is awake and available for communication. In some aspects, the network node may broadcast or multicast the awake signal 650.

Based at least in part on detecting that the network node is awake, the first UE may transmit an SR 655 and the second UE may transmit an SR 660 to request resources for transmission of the data associated with the deferred WUS 620 and the deferred WUS 625. The SRs 655 and 660 may be considered deferred WUSs.

As shown in FIG. 6 based at least in part on the first UE and the third UE deferring transmission of WUSs, the network node is able to wake up for a single awake mode 645 to communicate with all of the first UE, the second UE, and the third UE instead of waking up for two different awake modes (e.g., outside of the WUS occasions). This may conserve power resources of the network node.

As indicated above, FIG. 6 is provided as an example. Other examples may differ from what is described with regard to FIG. 6.

Figure 7:
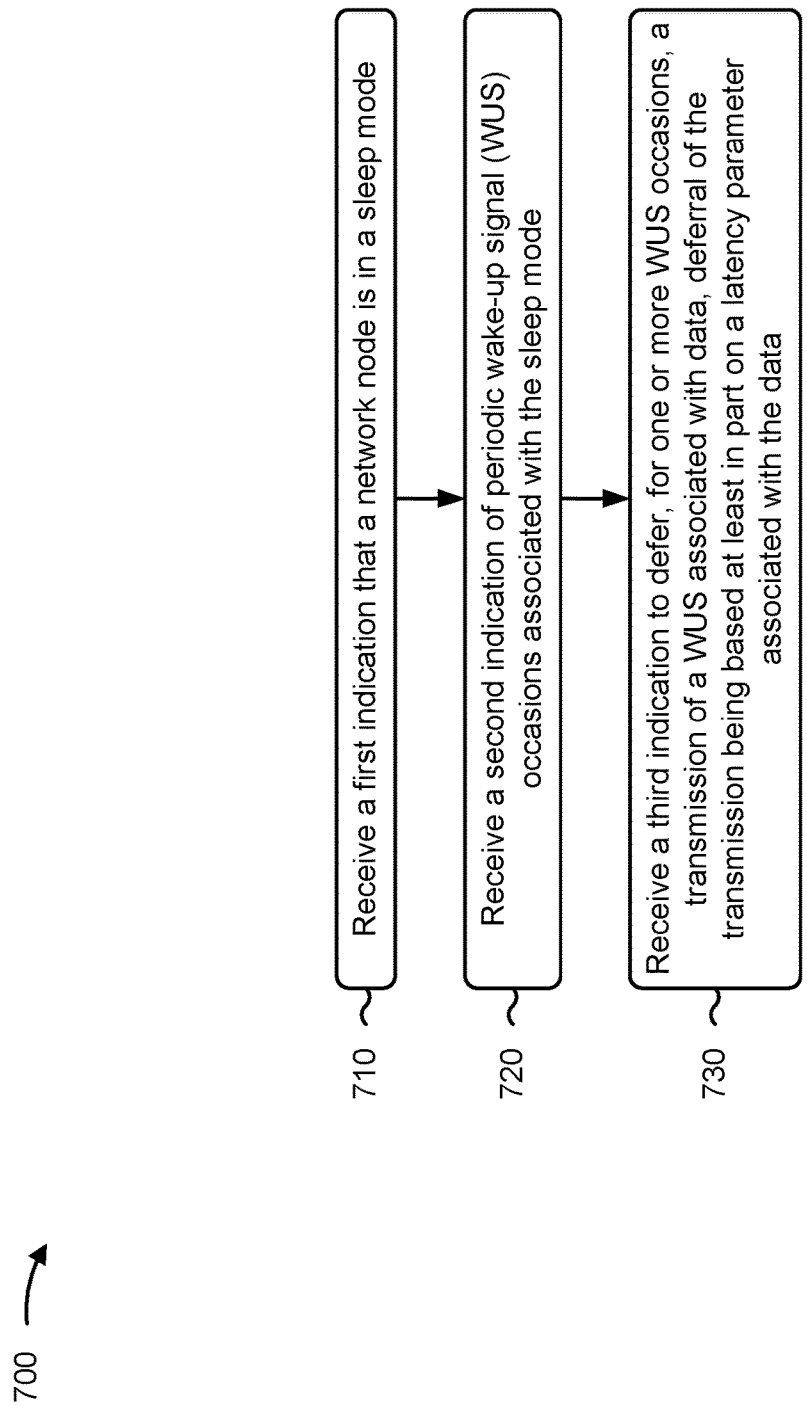
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for deferral of wake-up signaling for network node sleep modes.

As shown in FIG. 7, in some aspects, process 700 may include receiving a first indication that a network node is in a sleep mode (block 710). For example, the UE (e.g., using communication manager 140 and/or reception component 902, depicted in FIG. 9) may receive a first indication that a network node is in a sleep mode, as described above.

As further shown in FIG. 7, in some aspects, process 700 may include receiving a second indication of periodic WUS occasions associated with the sleep mode (block 720). For example, the UE (e.g., using communication manager 140 and/or reception component 902, depicted in FIG. 9) may receive a second indication of periodic WUS occasions associated with the sleep mode, as described above.

As further shown in FIG. 7, in some aspects, process 700 may include receiving a third indication to defer, for one or more WUS occasions, a transmission of a WUS associated with data, deferral of the transmission being based at least in part on a latency parameter associated with the data (block 730). For example, the UE (e.g., using communication manager 140 and/or reception component 902, depicted in FIG. 9) may receive a third indication to defer, for one or more WUS occasions, a transmission of a WUS associated with data, deferral of the transmission being based at least in part on a latency parameter associated with the data, as described above.

Process 700 may include additional aspects, such as any single aspect or any combination of aspects described below and/or in connection with one or more other processes described elsewhere herein.

In a first aspect, reception of the third indication comprises receiving the third indication via RRC signaling.

In a second aspect, alone or in combination with the first aspect, the third indication applies to transmissions, during the sleep mode, of WUSs having latency parameters that satisfy a threshold.

In a third aspect, alone or in combination with one or more of the first and second aspects, process 700 includes detecting that the data is buffered for transmission during the sleep mode, detecting that the data is associated with the latency parameter, and deferring the transmission of the WUS for the one or more WUS occasions based at least in part on the data being associated with the latency parameter.

In a fourth aspect, alone or in combination with one or more of the first through third aspects, deferral of the transmission is based at least in part on one or more of failing to receive an indication that the network node is awake for the one or more WUS occasions, the one or more WUS occasions being configured for WUSs associated with data having a latency requirement that satisfies a threshold, a number of the one or more WUS occasions satisfying a threshold, the one or more WUS occasions being configured for WUSs associated with data having a priority that satisfies a threshold, a buffer status associated with the data, or a signal priority of the WUS.

In a fifth aspect, alone or in combination with one or more of the first through fourth aspects, process 700 includes transmitting an indication of the deferral.

In a sixth aspect, alone or in combination with one or more of the first through fifth aspects, the indication of the deferral comprises one or more of an indication that the UE has the data buffered for transmission and that the UE has determined to defer transmission for the one or more WUS occasions, or a preamble of a WUS, of a set of candidate preambles of WUSs that are associated with indications of deferrals.

In a seventh aspect, alone or in combination with one or more of the first through sixth aspects, process 700 includes transmitting the WUS after the one or more WUS occasions, and receiving a resource allocation for transmitting the data, the resource allocation having a priority that is based at least in part on the indication of the deferral.

In an eighth aspect, alone or in combination with one or more of the first through seventh aspects, process 700 includes receiving an indication of an end of the sleep mode of the network node, and transmitting the WUS based at least in part on the indication of the end of the sleep mode.

In a ninth aspect, alone or in combination with one or more of the first through eighth aspects, reception of the indication of the end of the sleep mode of the network node comprises receiving a broadcast or multicast transmission of the indication of the end of the sleep mode of the network node.

In a tenth aspect, alone or in combination with one or more of the first through ninth aspects, receiving the first indication, receiving the second indication, and receiving the third indication comprises receiving the first indication, the second indication, and the third indication via one message or via two messages.

In an eleventh aspect, alone or in combination with one or more of the first through tenth aspects, the indication to defer, for the one or more WUS occasions, the transmission of the WUS associated with the data comprises an indication to defer the transmission of the WUS for at least one active interval, and the active interval is associated with a set of the one or more WUS occasions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
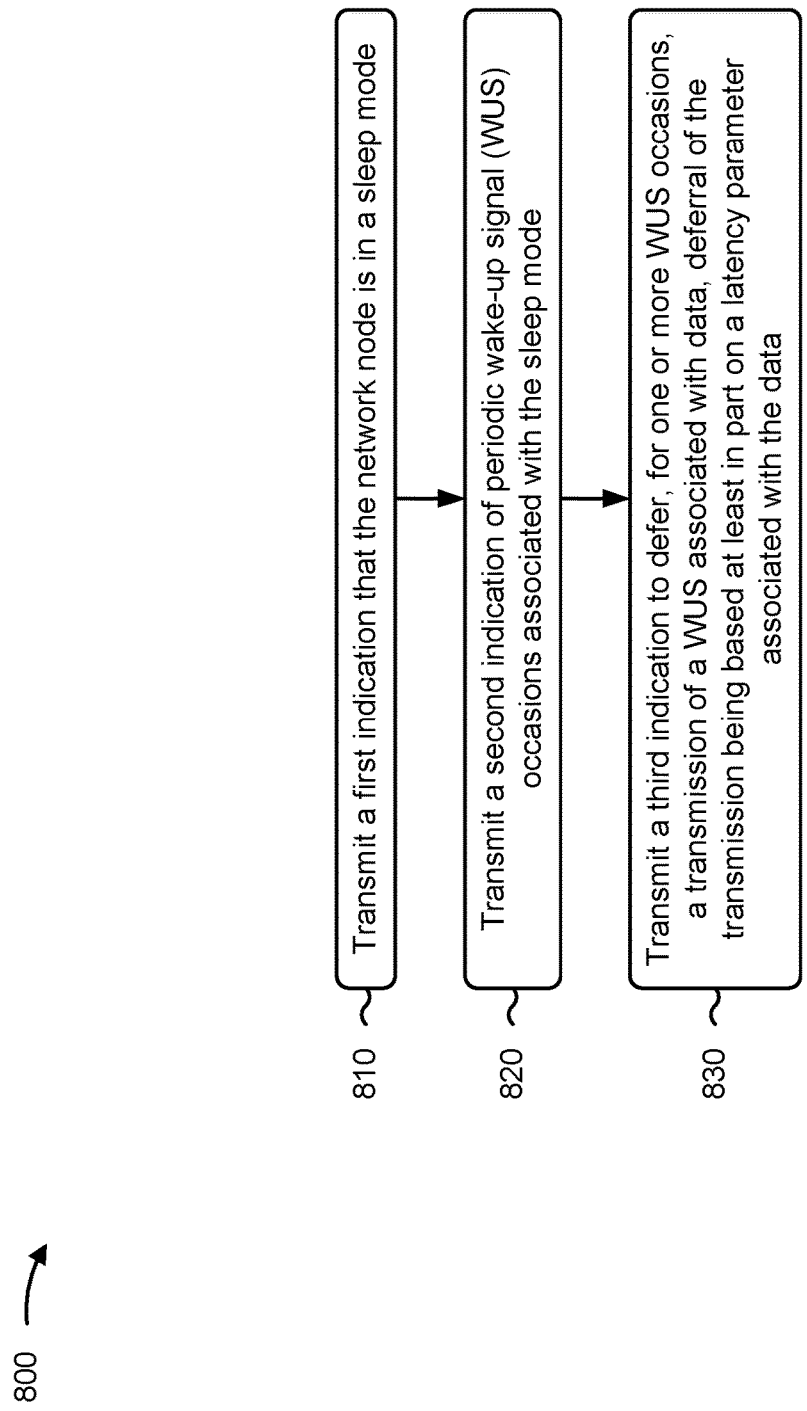
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with techniques for deferral of wake-up signaling for network node sleep modes.

As shown in FIG. 8, in some aspects, process 800 may include transmitting a first indication that the network node is in a sleep mode (block 810). For example, the network node (e.g., using communication manager 150 and/or transmission component 1004, depicted in FIG. 10) may transmit a first indication that the network node is in a sleep mode, as described above.

As further shown in FIG. 8, in some aspects, process 800 may include transmitting a second indication of periodic WUS occasions associated with the sleep mode (block 820). For example, the network node (e.g., using communication manager 150 and/or transmission component 1004, depicted in FIG. 10) may transmit a second indication of periodic WUS occasions associated with the sleep mode, as described above.

As further shown in FIG. 8, in some aspects, process 800 may include transmitting a third indication to defer, for one or more WUS occasions, a transmission of a WUS associated with data, deferral of the transmission being based at least in part on a latency parameter associated with the data (block 830). For example, the network node (e.g., using communication manager 150 and/or transmission component 1004, depicted in FIG. 10) may transmit a third indication to defer, for one or more WUS occasions, a transmission of a WUS associated with data, deferral of the transmission being based at least in part on a latency parameter associated with the data, as described above.

Process 800 may include additional aspects, such as any single aspect or any combination of aspects described below and/or in connection with one or more other processes described elsewhere herein.

In a first aspect, transmission of the third indication comprises transmitting the third indication via RRC signaling.

In a second aspect, alone or in combination with the first aspect, the third indication applies to transmissions, during the sleep mode, of WUSs having latency parameters that satisfy a threshold.

In a third aspect, alone or in combination with one or more of the first and second aspects, deferral of the transmission is based at least in part on one or more of failing to transmit an indication that the network node is awake for the one or more WUS occasions, the one or more WUS occasions being configured for WUSs associated with data having a latency requirement that satisfies a threshold, a number of the one or more WUS occasions satisfying a threshold, the one or more WUS occasions being configured for WUSs associated with data having a priority that satisfies a threshold, a buffer status associated with the data, or a signal priority of the WUS.

In a fourth aspect, alone or in combination with one or more of the first through third aspects, process 800 includes receiving, from a UE, an indication of the deferral.

In a fifth aspect, alone or in combination with one or more of the first through fourth aspects, the indication of the deferral comprises one or more of an indication that the UE has the data buffered for transmission and that the UE has determined to defer transmission for the one or more WUS occasions, or a preamble of a WUS, of a set of candidate preambles of WUSs that are associated with indications of deferrals.

In a sixth aspect, alone or in combination with one or more of the first through fifth aspects, process 800 includes receiving the WUS after the one or more WUS occasions, and transmitting a resource allocation for transmitting the data, the resource allocation having a priority that is based at least in part on the indication of the deferral.

In a seventh aspect, alone or in combination with one or more of the first through sixth aspects, process 800 includes transmitting an indication of an end of the sleep mode of the network node, and receiving the WUS based at least in part on the indication of the end of the sleep mode.

In an eighth aspect, alone or in combination with one or more of the first through seventh aspects, transmission of the indication of the end of the sleep mode of the network node comprises transmitting a broadcast or multicast transmission of the indication of the end of the sleep mode of the network node.

In a ninth aspect, alone or in combination with one or more of the first through eighth aspects, transmission of the first indication, transmission of the second indication, and transmission of the third indication comprises transmitting the first indication, the second indication, and the third indication via one message or via two messages.

In a tenth aspect, alone or in combination with one or more of the first through eleventh aspects, the indication to defer, for the one or more WUS occasions, the transmission of the WUS associated with the data comprises an indication to defer the transmission of the WUS for at least one active interval, and the active interval is associated with a set of the one or more WUS occasions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
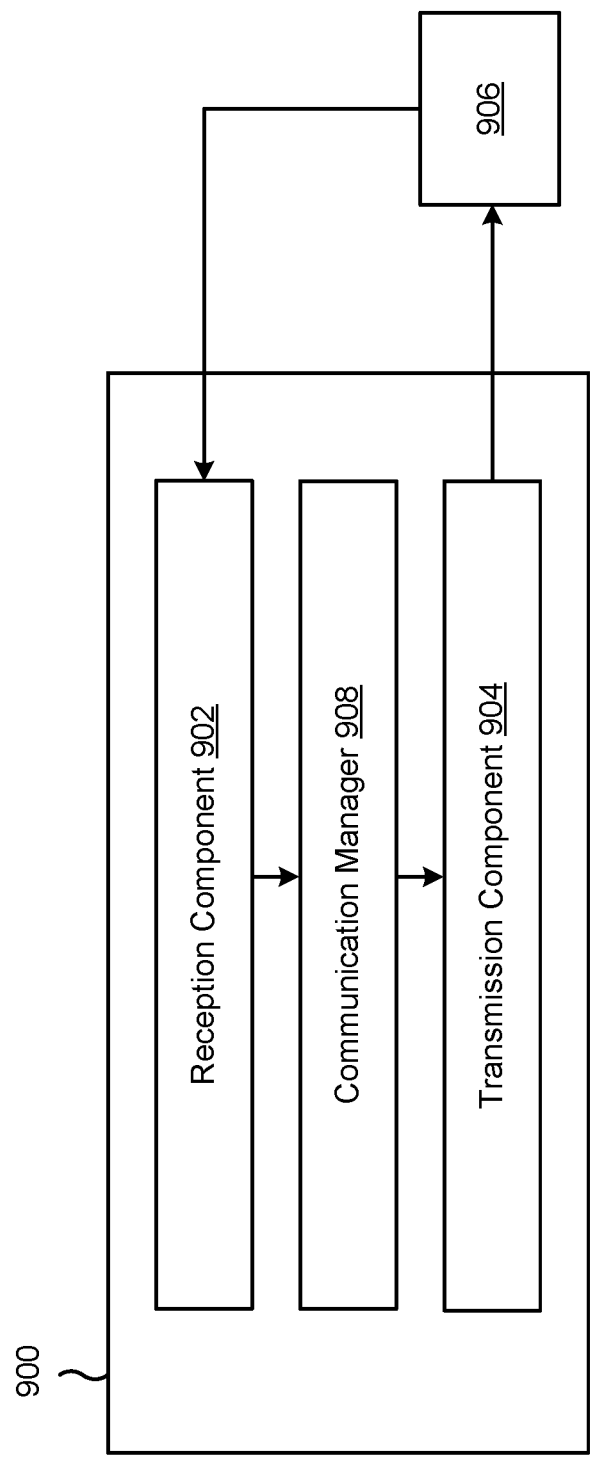
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the a communication manager 908 (e.g., communication manager 140). In some aspects, the communication manager 908 may provide and/or receive control signals and/or commands to the reception component 902 and/or the transmission component 904 associated with performance of one or more operations described herein.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a first indication that a network node is in a sleep mode. The reception component 902 may receive a second indication of periodic WUS occasions associated with the sleep mode. The reception component 902 may receive a third indication to defer, for one or more WUS occasions, a transmission of a WUS associated with data, deferral of the transmission being based at least in part on a latency parameter associated with the data.

The communication manager 908 may detect that the data is buffered for transmission during the sleep mode.

The communication manager 908 may detect that the data is associated with the latency parameter.

The communication manager 908 may defer the transmission of the WUS for the one or more WUS occasions based at least in part on the data being associated with the latency parameter.

The transmission component 904 may transmit an indication of the deferral.

The transmission component 904 may transmit the WUS after the one or more WUS occasions.

The reception component 902 may receive a resource allocation for transmitting the data, the resource allocation having a priority that is based at least in part on the indication of the deferral.

The reception component 902 may receive an indication of an end of the sleep mode of the network node.

The transmission component 904 may transmit the WUS based at least in part on the indication of the end of the sleep mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
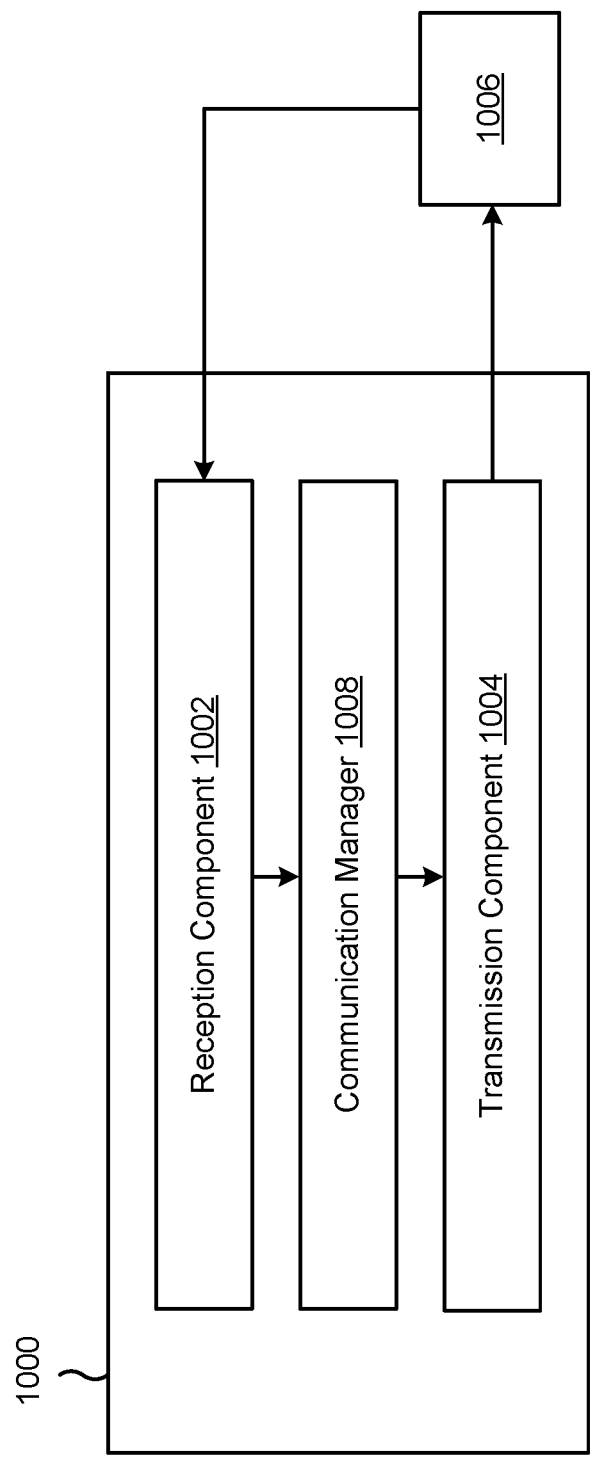
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150). In some aspects, the communication manager 1008 may provide and/or receive control signals and/or commands to the reception component 1002 and/or the transmission component 1004 associated with performance of one or more operations described herein.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit a first indication that the network node is in a sleep mode. The transmission component 1004 may transmit a second indication of periodic WUS occasions associated with the sleep mode. The transmission component 1004 may transmit a third indication to defer, for one or more WUS occasions, a transmission of a WUS associated with data, deferral of the transmission being based at least in part on a latency parameter associated with the data.

The reception component 1002 may receive, from a UE, an indication of the deferral.

The reception component 1002 may receive the WUS after the one or more WUS occasions.

The transmission component 1004 may transmit a resource allocation for transmitting the data, the resource allocation having a priority that is based at least in part on the indication of the deferral.

The transmission component 1004 may transmit an indication of an end of the sleep mode of the network node.

The reception component 1002 may receive the WUS based at least in part on the indication of the end of the sleep mode.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a first indication that a network node is in a sleep mode; receiving a second indication of periodic wake-up signal (WUS) occasions associated with the sleep mode; and receiving a third indication to defer, for one or more WUS occasions, a transmission of a WUS associated with data, deferral of the transmission being based at least in part on a latency parameter associated with the data.

Aspect 2: The method of Aspect 1, wherein reception of the third indication comprises: receiving the third indication via radio resource control (RRC) signaling.

Aspect 3: The method of any of Aspects 1-2, wherein the third indication applies to transmissions, during the sleep mode, of WUSs having latency parameters that satisfy a threshold.

Aspect 4: The method of any of Aspects 1-3, further comprising: detecting that the data is buffered for transmission during the sleep mode; detecting that the data is associated with the latency parameter; and deferring the transmission of the WUS for the one or more WUS occasions based at least in part on the data being associated with the latency parameter.

Aspect 5: The method of any of Aspects 1-4, wherein deferral of the transmission is based at least in part on one or more of: failing to receive an indication that the network node is awake for the one or more WUS occasions, the one or more WUS occasions being configured for WUSs associated with data having a latency requirement that satisfies a threshold, a number of the one or more WUS occasions satisfying a threshold, the one or more WUS occasions being configured for WUSs associated with data having a priority that satisfies a threshold, a buffer status associated with the data, or a signal priority of the WUS.

Aspect 6: The method of any of Aspects 1-5, further comprising: transmitting an indication of the deferral.

Aspect 7: The method of Aspect 6, wherein the indication of the deferral comprises one or more of: an indication that the UE has the data buffered for transmission and that the UE has determined to defer transmission for the one or more WUS occasions, or a preamble of a WUS, of a set of candidate preambles of WUSs that are associated with indications of deferrals.

Aspect 8: The method of any of Aspects 6-7, further comprising: transmitting the WUS after the one or more WUS occasions; and receiving a resource allocation for transmitting the data, the resource allocation having a priority that is based at least in part on the indication of the deferral.

Aspect 9: The method of any of Aspects 1-8, further comprising: receiving an indication of an end of the sleep mode of the network node; and transmitting the WUS based at least in part on the indication of the end of the sleep mode.

Aspect 10: The method of Aspect 9, wherein reception of the indication of the end of the sleep mode of the network node comprises: receiving a broadcast or multicast transmission of the indication of the end of the sleep mode of the network node.

Aspect 11: The method of any of Aspects 1-10, wherein reception of the first indication, reception of the second indication, and reception of the third indication comprises: receiving the first indication, the second indication, and the third indication via one message or via two messages.

Aspect 12: The method of any of Aspects 1-11, wherein the indication to defer, for the one or more WUS occasions, the transmission of the WUS associated with the data comprises an indication to defer the transmission of the WUS for at least one active interval, wherein the active interval is associated with a set of the one or more WUS occasions.

Aspect 13: A method of wireless communication performed by a network node, comprising: transmitting a first indication that the network node is in a sleep mode; transmitting a second indication of periodic wake-up signal (WUS) occasions associated with the sleep mode; and transmitting a third indication to defer, for one or more WUS occasions, a transmission of a WUS associated with data, deferral of the transmission being based at least in part on a latency parameter associated with the data.

Aspect 14: The method of Aspect 13, wherein transmission of the third indication comprises: transmitting the third indication via radio resource control (RRC) signaling.

Aspect 15: The method of any of Aspects 13-14, wherein the third indication applies to transmissions, during the sleep mode, of WUSs having latency parameters that satisfy a threshold.

Aspect 16: The method of any of Aspects 13-15, wherein deferral of the transmission is based at least in part on one or more of: failing to transmit an indication that the network node is awake for the one or more WUS occasions, the one or more WUS occasions being configured for WUSs associated with data having a latency requirement that satisfies a threshold, a number of the one or more WUS occasions satisfying a threshold, the one or more WUS occasions being configured for WUSs associated with data having a priority that satisfies a threshold, a buffer status associated with the data, or a signal priority of the WUS.

Aspect 17: The method of any of Aspects 13-16, further comprising: receiving, from a user equipment (UE), an indication of the deferral.

Aspect 18: The method of Aspect 17, wherein the indication of the deferral comprises one or more of: an indication that the UE has the data buffered for transmission and that the UE has determined to defer transmission for the one or more WUS occasions, or a preamble of a WUS, of a set of candidate preambles of WUSs that are associated with indications of deferrals.

Aspect 19: The method of any of Aspects 17-18, further comprising: receiving the WUS after the one or more WUS occasions; and transmitting a resource allocation for transmitting the data, the resource allocation having a priority that is based at least in part on the indication of the deferral.

Aspect 20: The method of any of Aspects 13-19, further comprising: transmitting an indication of an end of the sleep mode of the network node; and receiving the WUS based at least in part on the indication of the end of the sleep mode.

Aspect 21: The method of Aspect 20, wherein transmission of the indication of the end of the sleep mode of the network node comprises: transmitting a broadcast or multicast transmission of the indication of the end of the sleep mode of the network node.

Aspect 22: The method of Aspect 21, wherein transmission of the first indication, transmission of the second indication, and transmission of the third indication comprises: transmitting the first indication, the second indication, and the third indication via one message or via two messages.

Aspect 23: The method of any of Aspects 13-22, wherein the indication to defer, for the one or more WUS occasions, the transmission of the WUS associated with the data comprises an indication to defer the transmission of the WUS for at least one active interval, wherein the active interval is associated with a set of the one or more WUS occasions.

Aspect 24: An apparatus for wireless communication at a device, comprising a processor; memory coupled with the processor; and instructions stored in the memory and executable by the processor to cause the apparatus to perform the method of one or more of Aspects 1-21.

Aspect 25: A device for wireless communication, comprising a memory and one or more processors coupled to the memory, the one or more processors configured to perform the method of one or more of Aspects 1-21.

Aspect 26: An apparatus for wireless communication, comprising at least one means for performing the method of one or more of Aspects 1-21.

Aspect 27: A non-transitory computer-readable medium storing code for wireless communication, the code comprising instructions executable by a processor to perform the method of one or more of Aspects 1-21.

Aspect 28: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   receiving a first indication that a network node is in a sleep mode;
   receiving a second indication of periodic wake-up signal (WUS) occasions associated with the sleep mode; and
   receiving a third indication to defer, for one or more WUS occasions, a transmission of a WUS associated with data, deferral of the transmission being based at least in part on a latency parameter associated with the data.

2. The method of claim 1, wherein reception of the third indication comprises:
   receiving the third indication via radio resource control (RRC) signaling.

3. The method of claim 1, wherein the third indication applies to transmissions, during the sleep mode, of WUSs having latency parameters that satisfy a threshold.

4. The method of claim 1, further comprising:
   detecting that the data is buffered for transmission during the sleep mode;
   detecting that the data is associated with the latency parameter; and
   deferring the transmission of the WUS for the one or more WUS occasions based at least in part on the data being associated with the latency parameter.

5. The method of claim 1, wherein deferral of the transmission is based at least in part on one or more of:
   failing to receive an indication that the network node is awake for the one or more WUS occasions,
   the one or more WUS occasions being configured for WUSs associated with data having a latency requirement that satisfies a threshold,
   a number of the one or more WUS occasions satisfying a threshold,
   the one or more WUS occasions being configured for WUSs associated with data having a priority that satisfies a threshold,
   a buffer status associated with the data, or
   a signal priority of the WUS.

6. The method of claim 1, further comprising:
   transmitting an indication of the deferral.

7. The method of claim 6, wherein the indication of the deferral comprises one or more of:
   an indication that the UE has the data buffered for transmission and that the UE has determined to defer transmission for the one or more WUS occasions, or
   a preamble of a WUS, of a set of candidate preambles of WUSs that are associated with indications of deferrals.

8. The method of claim 6, further comprising:
   transmitting the WUS after the one or more WUS occasions; and
   receiving a resource allocation for transmitting the data, the resource allocation having a priority that is based at least in part on the indication of the deferral.

9. The method of claim 1, further comprising:
   receiving an indication of an end of the sleep mode of the network node; and
   transmitting the WUS based at least in part on the indication of the end of the sleep mode.

10. The method of claim 9, wherein reception of the indication of the end of the sleep mode of the network node comprises:
    receiving a broadcast or multicast transmission of the indication of the end of the sleep mode of the network node.

11. The method of claim 1, wherein reception of the first indication, reception of the second indication, and reception of the third indication comprises:
    receiving the first indication, the second indication, and the third indication via one message or via two messages.

12. The method of claim 1, wherein the indication to defer, for the one or more WUS occasions, the transmission of the WUS associated with the data comprises:
    an indication to defer the transmission of the WUS for at least one active interval, wherein the active interval is associated with a set of the one or more WUS occasions.

13. A method of wireless communication performed by a network node, comprising:
    transmitting a first indication that the network node is in a sleep mode;
    transmitting a second indication of periodic wake-up signal (WUS) occasions associated with the sleep mode; and
    transmitting a third indication to defer, for one or more WUS occasions, a transmission of a WUS associated with data, deferral of the transmission being based at least in part on a latency parameter associated with the data.

14. The method of claim 13, wherein transmission of the third indication comprises:
    transmitting the third indication via radio resource control (RRC) signaling.

15. The method of claim 13, wherein the third indication applies to transmissions, during the sleep mode, of WUSs having latency parameters that satisfy a threshold.

16. The method of claim 13, wherein deferral of the transmission is based at least in part on one or more of:
    failing to transmit an indication that the network node is awake for the one or more WUS occasions, the one or more WUS occasions being configured for WUSs associated with data having a latency requirement that satisfies a threshold,
a number of the one or more WUS occasions satisfying a threshold,
the one or more WUS occasions being configured for WUSs associated with data having a priority that satisfies a threshold,
a buffer status associated with the data, or
a signal priority of the WUS.

17. The method of claim 13, further comprising:
receiving, from a user equipment (UE), an indication of the deferral.

18. The method of claim 17, wherein the indication of the deferral comprises one or more of:
an indication that the UE has the data buffered for transmission and that the UE has determined to defer transmission for the one or more WUS occasions, or
a preamble of a WUS, of a set of candidate preambles of WUSs that are associated with indications of deferrals.

19. The method of claim 17, further comprising:
receiving the WUS after the one or more WUS occasions; and
transmitting a resource allocation for transmitting the data, the resource allocation having a priority that is based at least in part on the indication of the deferral.

20. The method of claim 13, further comprising:
transmitting an indication of an end of the sleep mode of the network node; and
receiving the WUS based at least in part on the indication of the end of the sleep mode.

21. The method of claim 20, wherein transmission of the indication of the end of the sleep mode of the network node comprises:
transmitting a broadcast or multicast transmission of the indication of the end of the sleep mode of the network node.

22. The method of claim 21, wherein transmission of the first indication, transmission of the second indication, and transmission of the third indication comprises:
transmitting the first indication, the second indication, and the third indication via one message or via two messages.

23. The method of claim 13, wherein the indication to defer, for the one or more WUS occasions, the transmission of the WUS associated with the data comprises:
an indication to defer the transmission of the WUS for at least one active interval, wherein the active interval is associated with a set of the one or more WUS occasions.

24. A user equipment (UE) for wireless communication, comprising:
a memory; and
one or more processors, coupled to the memory, configured to:
receive a first indication that a network node is in a sleep mode;
receive a second indication of periodic wake-up signal (WUS) occasions associated with the sleep mode; and
receive a third indication to defer, for one or more WUS occasions, a transmission of a WUS associated with data, deferral of the transmission being based at least in part on a latency parameter associated with the data.

25. The UE of claim 24, wherein the third indication applies to transmissions, during the sleep mode, of WUSs having latency parameters that satisfy a threshold.

26. The UE of claim 24, wherein the one or more processors are further configured to:
detect that the data is buffered for transmission during the sleep mode;
detect that the data is associated with the latency parameter; and
defer the transmission of the WUS for the one or more WUS occasions based at least in part on the data being associated with the latency parameter.

27. The UE of claim 24, wherein deferral of the transmission is based at least in part on one or more of:
failing to receive an indication that the network node is awake for the one or more WUS occasions,
the one or more WUS occasions being configured for WUSs associated with data having a latency requirement that satisfies a threshold,
a number of the one or more WUS occasions satisfying a threshold,
the one or more WUS occasions being configured for WUSs associated with data having a priority that satisfies a threshold,
a buffer status associated with the data, or
a signal priority of the WUS.

28. A network node for wireless communication, comprising:
a memory; and
one or more processors, coupled to the memory, configured to:
transmit a first indication that the network node is in a sleep mode;
transmit a second indication of periodic wake-up signal (WUS) occasions associated with the sleep mode; and
transmit a third indication to defer, for one or more WUS occasions, a transmission of a WUS associated with data, deferral of the transmission being based at least in part on a latency parameter associated with the data.

29. The network node of claim 28, wherein the one or more processors are further configured to:
receive, from a user equipment (UE), an indication of the deferral.

30. The network node of claim 29, wherein the indication of the deferral comprises one or more of:
an indication that the UE has the data buffered for transmission and that the UE has determined to defer transmission for the one or more WUS occasions, or
a preamble of a WUS, of a set of candidate preambles of WUSs that are associated with indications of deferrals.

* * * * *